United States Patent [19]

Ishikawa et al.

[11] Patent Number: 5,792,570
[45] Date of Patent: Aug. 11, 1998

[54] MAGNETIC RECORDING MEDIUM

[75] Inventors: Akira Ishikawa; Hidehiko Nakayama; Kazutaka Yamashita, all of Tochigi-ken, Japan

[73] Assignee: Kao Corporation, Tokyo, Japan

[21] Appl. No.: 743,852

[22] Filed: Nov. 5, 1996

[30] Foreign Application Priority Data

Nov. 8, 1995 [JP] Japan ................. 7-290141

[51] Int. Cl.$^6$ ................................................. G11B 5/66
[52] U.S. Cl. .............................. 428/694 BA; 428/694 BH; 428/323
[58] Field of Search .................. 428/694 BH, 694 BA, 428/323

[56] References Cited

U.S. PATENT DOCUMENTS

| | | | |
|---|---|---|---|
| 5,648,014 | 7/1997 | Hatatani et al. | 428/403 |
| 5,650,194 | 7/1997 | Yamasaki et al. | 427/131 |

FOREIGN PATENT DOCUMENTS 7 29151  1/1995  Japan .
7-29152  1/1995  Japan .

*Primary Examiner*—Melvyn I. Marquis
*Attorney, Agent, or Firm*—Oblon, Spivak, McClelland, Maier & Neustadt, P.C.

[57] ABSTRACT

A magnetic recording medium comprising a substrate and a magnetic layer provided thereon, the magnetic layer containing:

a binder,
(a) an acicular ferromagnetic metal powder having an average major axis length of 0.05 to 0.14 μm and a coercive force of 1700 to 2300 Oe or (c) a tabular hexagonal ferrite powder having a tabular diameter of 0.01 to 0.07 μm and a coercive force of 1400 to 2200 Oe, and
(b) a spherical or amorphous spinel ferrite powder having an average particle size of 0.005 to 0.09 μm and a coercive force of more than 0 and less than 150 Oe, wherein the mixing ratio of the spinel ferrite powder (b) to the ferromagnetic metal powder (a) or the hexagonal ferrite powder (c), i.e., (b)/(a) or (b)/(c), is 0.03 to 0.3 by weight.

24 Claims, 1 Drawing Sheet

Fig.1

MAGNETIC RECORDING MEDIUM

BACKGROUND OF THE INVENTION

1. Field of the Invention

The present invention relates to a magnetic recording medium which has excellent surface smoothness and electromagnetic characteristics.

2. Description of the Background

There has been an increasing demand for coated magnetic recording media, which are obtained by applying a magnetic coating composition comprising a magnetic powder and a binder dispersed in an organic solvent onto a substrate, such as a polyester substrate, and then drying the coating. Such a magnetic recording medium is capable of high-density recording as high definition video tapes, large capacity floppy discs, and the like.

In order to meet this demand, a magnetic powder having a high coercive force and a high saturation magnetization is preferred for use. A ferromagnetic metal powder is suitable for use as such the magnetic powder. In particular, a ferromagnetic metal powder containing iron as the main component (hereinafter simply referred to as metal powder) is preferred.

However, since the metal powder is chemically unstable and susceptible to rust (oxidation), the saturation magnetization tends to decrease because of oxidation. Further, the metal powder generally results in a higher noise level for the recording medium than an oxide type magnetic powder.

In order to achieve high-density recording, it is necessary to reduce the particle size of the magnetic powder. However, a magnetic powder having a reduced particle size has an increased specific surface area and is also susceptible to oxidation and has poor corrosion resistance. If the surface of the metal powder is sufficiently oxidized in order to avoid these problems, the powder has reduced σs. Besides, as the particle size of the magnetic powder becomes smaller, the dispersibility is so much the poorer, and the powder is difficult to uniformly disperse in the binder to form a magnetic layer. As a result, it is difficult to obtain a magnetic layer having satisfactory surface smoothness, which leads to reduction in the S/N ratio.

A vertical magnetic recording system has also been proposed as an alternative means for satisfying the demand for high-density recording, and hexagonal ferrite powders have been used as a suitable magnetic powder for this system.

However, hexagonal ferrite particles, though possessing relatively satisfactory radio-frequency characteristics, are likely in a stacked position which makes the surface condition of the magnetic layer worse, i.e., the surface roughness is greatly increased, which leads to reduction in radio-frequency characteristics.

In order to solve these problems of magnetic recording media which contain a ferromagnetic metal powder or a hexagonal ferrite powder, Japanese Patent Laid-Open Nos. 7-29151 and 7-29152 propose magnetic recording media having a magnetic layer of specific formulation. The proposed magnetic recording media, however, still do not resolve these problems, and accordingly, a need continues to exist for a magnetic recording medium which exhibits excellent surface smoothness and electromagnetic characteristics.

SUMMARY OF THE INVENTION

Accordingly, one object of the present invention is to provide a magnetic recording medium whose magnetic layer has excellent surface smoothness and which exhibits excellent electromagnetic characteristics in the radio-frequency region.

Briefly, this object and other objects of the present invention as hereinafter will become more readily apparent can be attained by a magnetic recording medium comprising a substrate and a magnetic layer provided thereon, wherein the magnetic layer comprises:

a binder,
  (a) an acicular ferromagnetic metal powder having an average major axis length of 0.05 to 0.14 µm and a coercive force of 1700 to 2300 Oe, and
  (b) a spherical or amorphous spinel ferrite powder having an average particle size of 0.005 to 0.09 µm and a coercive force of more than 0 and less than 150 Oe, wherein the mixing ratio of the spinel ferrite powder (b) to the ferromagnetic metal powder (a) ((b)/(a)) is 0.03 to 0.3 by weight (hereinafter referred to as the first invention).

Another aspect of the invention (second invention) is a magnetic recording medium comprising a substrate and a magnetic layer provided thereon, wherein the magnetic layer comprises:

a binder,
  (c) a tabular hexagonal ferrite powder having a tabular diameter of 0.01 to 0.07 µm and a coercive force of 1400 to 2200 Oe, and
  (b) a spherical or amorphous spinel ferrite powder having an average particle size of 0.005 to 0.09 µm and a coercive force of more than 0 and less than 150 Oe, wherein the mixing ratio of the spinel ferrite powder (b) to the hexagonal ferrite powder (c) ((b)/(c)) is 0.03 to 0.3 by weight.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

It has now been found that a magnetic recording medium having a magnetic layer containing a specific ferromagnetic powder or a specific hexagonal ferrite powder and a specific spinel ferrite powder at a specific mixing ratio exhibits excellent surface smoothness and electromagnetic characteristics in the radio-frequency region.

The present invention, inclusive of the first and second inventions, provides magnetic recording media, wherein the spinel ferrite powder (b) is at least one member selected from the group consisting of magnetite, Mn—Zn ferrite, Ni—Zn ferrite, Zn ferrite, Mn ferrite, and Ni ferrite.

The present invention, in both invention embodiments, provides magnetic recording media, wherein a nonmagnetic layer or a magnetic intermediate layer is positioned between the magnetic layer and the substrate, and the magnetic layer has a thickness of 0.05 to 0.6 µm.

The present invention, in both invention embodiments, provides magnetic recording media, wherein the magnetic intermediate layer contains a spinel ferrite powder having a coercive force of more than 0 and less than 150 Oe.

The present invention, in both invention embodiments, provides magnetic recording media, wherein the magnetic layer is a layer formed by applying, on the nonmagnetic layer or the magnetic intermediate layer, a magnetic coating composition. The nonmagnetic layer or the magnetic intermediate layer is a layer formed by applying a nonmagnetic coating composition or a magnetic coating composition of the magnetic intermediate layer, respectively, on the substrate, and the magnetic layer and the nonmagnetic layer or the magnetic intermediate layer are layers formed by simultaneous coating.

The present invention, in both invention embodiments, provides magnetic recording media, wherein the binder contains at least one of a vinyl chloride copolymer and a polyurethane each containing, in the polymer molecule, $10^{-8}$ to $10^{-2}$ equivalent/g of at least one polar group selected from the group consisting of a phosphoric acid group, a salt thereof, a sulfonic acid group and a salt thereof.

The present invention, in both invention embodiments, provides magnetic recording media, wherein the magnetic layer which is formed by coating a substrate with a magnetic coating composition and simultaneously subjecting the coating to magnetic orientation in the direction perpendicular or oblique to the thickness direction of the magnetic recording medium.

The magnetic recording medium of the present invention exhibits excellent surface smoothness of the magnetic layer and exhibits excellent electromagnetic characteristics in the radio-frequency region.

In particular, the magnetic recording medium of the first embodiment has improved surface smoothness of the magnetic layer and is free of the disadvantages arising from the use of metal powder in order to provide it excellent electromagnetic characteristics.

The second embodiment of the invention provides a magnetic recording medium containing hexagonal ferrite powder, in which the magnetic layer has improved surface smoothness and thereby exhibits improved electromagnetic characteristics.

The first embodiment of the magnetic recording medium is described in detail.

The preferred structure of the magnetic recording medium of the present invention is explained with reference to FIG. 1.

Figure 1:
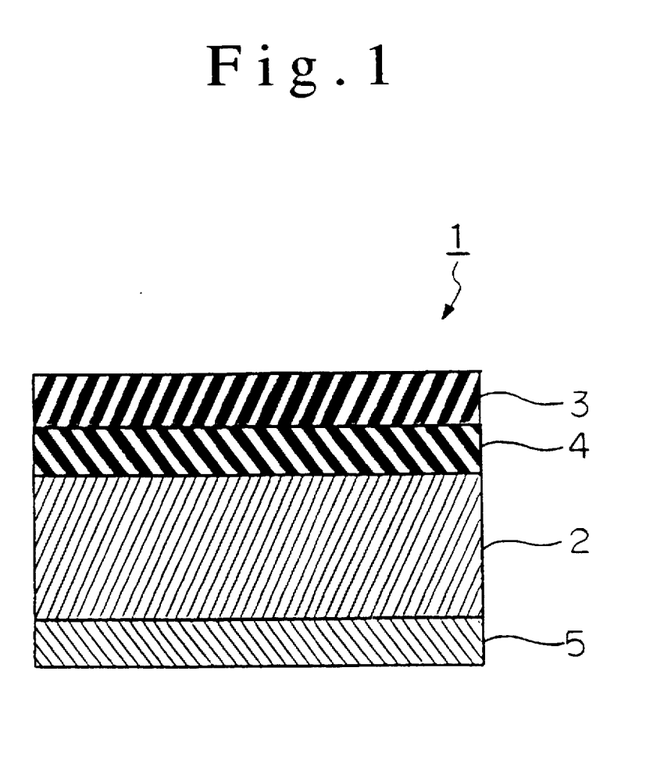
FIG. 1 is a schematic cross section showing the structure of the magnetic recording medium of the present invention.

The magnetic recording medium 1 of the present invention shown in FIG. 1 comprises a substrate 2 and a magnetic layer 3 provided on the substrate 2. If desired, a nonmagnetic an intermediate magnetic layer 4 is provided between the substrate 2 and the magnetic layer 3. If desired, a backcoating layer 5 is provided on the back side of the substrate 2.

The magnetic recording medium of the present invention may further have other layers in addition to the substrate 2, magnetic layer 3, and nonmagnetic layer or intermediate magnetic layer 4, and backcoating layer 5. For example, a primer layer may be provided between the substrate 2 and the nonmagnetic layer or the intermediate magnetic layer 4 or the backcoating layer 5; and a signal recording layer for recording servo signals, etc. may be provided in order to cope with hard systems using long wavelength signals.

The substrate 2 which can be used in the magnetic recording medium of the present invention can be selected from those commonly known with no particular restriction. Examples of useful substrates include flexible films or discs made of polymers; and films, discs or cards made of nonmagnetic metals, e.g., Cu, Al or Zn, glass, or ceramics, e.g., porcelain or earthenware.

The polymers providing flexible films or discs include polyesters such as polyethylene terephthalate, polybutylene terephthalate, polyethylene naphthalate, polycyclohexylene dimethylene terephthalate, and polyethylene bisphenoxycarboxylate; polyolefins such as polyethylene and polypropylene; cellulose derivatives such as cellulose acetate butyrate and cellulose acetate propionate; vinyl resins such as polyvinyl chloride and polyvinylidene chloride; polyamides, polyimides, polycarbonates, polysulfones, polyether ether ketones, polyurethanes, and the like. These polymers may be used either individually or in a combination of two or more.

In the magnetic recording medium of the present invention, the backcoating layer which is, if desired, provided on the back side of the substrate can be formed by using any known backcoating composition with no particular limitation.

In the magnetic recording medium of the present invention, the magnetic layer provided on the substrate is a layer comprising (a) a specific ferromagnetic metal powder, (b) a specific spinel ferrite powder, and a binder, with the mixing ratio of the ferromagnetic metal powder (a) and the spinel ferrite powder (b) falling within a specific range. The magnetic layer is formed by coating the substrate or the nonmagnetic layer or the magnetic intermediate layer with a magnetic coating composition.

The magnetic coating composition preferably comprises ferromagnetic metal powder (a), spinel ferrite powder (b), a binder, and a solvent as the main components.

In the present invention, the specific ferromagnetic metal powder (a) used in the magnetic layer is an acicular ferromagnetic metal powder having an average major axis length of 0.05 to 0.14 µm, preferably 0.05 to 0.12 µm, and a coercive force of 1700 to 2300 Oe, preferably 1800 to 2300 Oe.

If the average major axis length of the ferromagnetic metal powder (a) is less than 0.05 µm, the powder is difficult to disperse in the coating composition, tending to fail to achieve sufficient surface smoothness. If it exceeds 0.14 µm, the S/N ratio is reduced. If the coercive force is less than 1700 Oe, the output in the radio-frequency region is reduced. If it exceeds 2300 Oe, the overwrite characteristics and erasability are reduced.

The ferromagnetic metal powder (a) preferably has an acicular ratio of 3 to 20, an X-ray measured particle size of 130 to 250 Å, and a specific surface area of 45 to 80 m²/g.

The ferromagnetic metal powder (a) preferably has a saturation magnetization of 110 to 160 emu/g, more preferably 120 to 150 emu/g. If the saturation magnetization is less than 110 emu/g, the magnetic flux density is reduced which reduces the output. If it exceeds 160 emu/g, the surface oxide layer of the particles would be thinned and, as a result, the storage stability of the magnetic flux density is reduced, i.e., the tendency for deterioration increases with time.

Ferromagnetic metal powder (a) is not particularly limited provided that the requirements of longer axis length and coercive force ares satisfied. Those having a metal content of 50% by weight or more, with at least 60% by weight of the metal content being Fe, are included. Examples of such ferromagnetic metal powders include Fe—Co, Fe—Ni, Fe—Al, Fe—Ni—Al, Fe—Co—Ni, Fe—Ni—Al—Zn, Fe—Al—Si, and Fe—Co—Ni—Al—Si.

If desired, the ferromagnetic metal powder (a) may contain a rare earth element, e.g., La, Nd and Y, an alkaline earth metal, e.g., Ba, or a transition metal element.

In order to improve the dispersibility of the particles of the ferromagnetic metal powder, the ferromagnetic metal powder (a) is preferably subjected to a surface treatment.

The surface treatment can be carried out in the same manner as described in T. J. Wiseman et al., "*Characterization of Powder Surfaces*", Academic Press (1976). For example, the surface of the ferromagnetic metal particles can be coated with an inorganic oxide such as $Al_2O_3$, $SiO_2$, $TiO_2$, $ZrO_2$, $SnO_2$, $Sb_2O_3$ or $ZnO$. These inorganic oxides may be used either individually or as a combination of two or more.

The surface treatment can also be carried out by using an organic substance such as a silane coupling agent, a titan coupling agent or an aluminum coupling agent.

In the present invention, the specific ferrite powder (b) used in the magnetic layer is a spherical or amorphous spinel ferrite powder having an average particle size of 0.005 to 0.09 µm, preferably 0.008 to 0.09 µm, and a coercive force of more than 0 and less than 150 Oe, preferably more than 0 and less than 130 Oe.

If the average particle size is less than 0.005 µm, the powder is difficult to disperse in the magnetic coating composition. If it exceeds 0.09 µm, the surface smoothness of the magnetic layer is reduced.

The coercive force cannot be zero. If it exceeds 150 Oe, the magnetic layer will have a distribution of magnetic characteristics, which causes problems in recording and reproduction.

The term "spherical" as used above means having a shape near to a true sphere, and the term "amorphous" as used above means having no such symmetry as in a polygonal shape.

The spinel ferrite powder (b) preferably has a saturation magnetization of 20 to 90 emu/g and a specific surface area of 10 to 150 $m^2/g$.

The spinel ferrite powder is not particularly limited provided that it has the above-specified average particle size and coercive force. Examples of suitable spinel ferrite powders are magnetite, $MnFe_2O_4$, $CoFe_2O_4$, $NiFe_2O_4$, $MgFe_2O_4$, $Li_{0.5}Fe_{2.5}O_4$, Mn—Zn ferrite, Ni—Zn ferrite, Ni—Cu ferrite, Cu—Zn ferrite, Mg—Zn ferrite, and Li—Zn ferrite. They may be used either individually or in a combination of two or more. In particular, at least one member selected from the group consisting of magnetite, Mn—Zn ferrite, Ni—Zn ferrite, Zn ferrite, Mn ferrite, and Ni ferrite is preferred.

The binder which can be used in the present invention includes thermoplastic resins, thermosetting resins, and reactive resins, either individually or in mixtures. Examples of suitable binders include vinyl chloride resins, polyester, polyurethane, nitrocellulose, and epoxy resins. In addition, the resins described in Japanese Patent Laid-Open No. 57-162128, page 2, upper right column, line 19 to lower right column, line 19 are also employable. These binders can contain a polar group to improve dispersibility.

The binder preferably contains at least one vinyl chloride copolymer and a polyurethane each containing, in a polymer molecule, $10^{-8}$ to $10^{-2}$ equivalent/g of at least one polar group selected from the group consisting of a phosphoric acid group, a salt thereof, a sulfonic acid group and a salt thereof. That is, in the present invention, the binder preferably comprises a vinyl chloride copolymer containing a specific amount of a specific polar group and/or a polyurethane containing a specific amount of a specific polar group and, if desired, further comprises other binder resins.

Salts of the phosphoric acid group include an alkali metal (Na, K, etc.) salt, an ammonium salt, an alkylammonium salt, and salts of the sulfonic acid group include an alkali metal (e.g., Na, K, etc.) salt, an ammonium salt, and an alkylammonium salt.

The vinyl chloride copolymer preferably has a degree of polymerization of 120 to 500, and the polyurethane preferably has a number average molecular weight of 6,000 to 60,000 and a weight average molecular weight of 10,000 to 140,000.

Specific examples of the vinyl chloride copolymer are "MR-104", "MR-105", "MR-110", "MR-114", and "MR-115", all produced by Nippon Zeon Co., Ltd. Specific examples of the polyurethane include commercially available products, such as "Vylon UR-8200", "Vylon UR-8300", and "Vylon UR-8700", all produced by Toyobo Co., Ltd; "Mitec MX-9009" produced by Mitsubishi Chemical Co., Ltd.; and "CA-151" and "CA-152" both produced by Morton International.

The mixing ratio of the spinel ferrite powder (b) to the ferromagnetic metal powder (a), i.e., (b)/(a), is 0.03 to 0.3, preferably 0.05 to 0.25.

If the (b)/(a) mixing ratio is less than 0.03, the effect of adding the spinel ferrite power (b) is insubstantial. If the ratio exceeds 0.3, the magnetic layer will have a distribution of magnetic characteristics, which cause problems in recording and reproduction.

The binder is used in an amount of about 5 to 100 parts by weight, preferably 5 to 70 parts by weight, per 100 parts by weight of the total amount of the ferromagnetic metal powder (a) and the spinel ferrite powder (b).

Suitable solvents include ketones, esters, ethers, aromatic hydrocarbons, and chlorinated hydrocarbons. Specific examples of suitable solvents are described in Japanese Patent Laid-Open No. 57-162128, page 3, lower right column, line 17 to page 4, lower left column, line 10.

The solvent is used in an amount of 80 to 500 parts by weight, preferably 100 to 350 parts by weight, per 100 parts by weight of the total amount of the ferromagnetic metal powder (a) and the spinel ferrite powder (b).

If desired, the magnetic coating composition may contain additives generally used in magnetic recording media such as dispersants, lubricants, abrasives, antistatics, rust inhibitors, antifungals, and hardeners. Specific examples of usable additives are given in Japanese Patent Laid-Open No. 57-162128, page, 2, upper left column, line 6 to upper right column, line 10 and page 3, upper left column, line 6 to page 3, upper right column, line 18.

The magnetic coating composition can be prepared, for example, by initially mixing the ferromagnetic metal powder (a), the spinel ferrite powder (b), the binder, and a part of the solvent in a Naughter mixer, or the like, kneading the premixture in a continuous twin-screw kneader, or the like, diluting the mixture with another part of the solvent, followed by dispersing by means of a sand mill, or the like, adding additives such as a lubricant to the dispersion, filtering the mixture, and adding thereto a hardener such as a polyisocyanate, and the remainder of the solvent.

The magnetic layer has a thickness of 0.05 to 1.0 µm, preferably 0.05 to 0.8 µm. If the thickness is less than 0.05 µm, uniform coating is difficult, and the resulting layer tends to have reduced durability. If the thickness exceeds 1.0 µm, thickness loss increases, tending to result in considerable reduction in overwrite characteristics. Accordingly, the above thickness range is preferred.

Where, in particular, a nonmagnetic layer or an intermediate magnetic layer is provided between the magnetic layer and the substrate, the magnetic layer preferably has a thickness of 0.05 to 0.6 µm.

The nonmagnetic layer or intermediate layer which can be provided, if desired, will be described.

The nonmagnetic layer is a layer formed by coating the substrate with a nonmagnetic coating composition. The nonmagnetic coating composition preferably includes a coating composition comprising nonmagnetic powder, a binder, and a solvent and a coating composition comprising a binder and a solvent.

The nonmagnetic powder is not particularly limited in scope as long as it is nonmagnetic. Suitable nonmagnetic powders include particles of carbon black, graphite, titanium oxide, bairium sulfate, zinc sulfide, magnesium carbonate, calcium carbonate, zinc oxide, calcium oxide, magnesium oxide, tungsten disulfide, molybdenum disulfide, boron nitride, tin dioxide, silicon dioxide, nonmagnetic chromium oxide, alumina, silicon carbide, cerium oxide, corundum, artificial diamond, nonmagnetic iron oxide, garnet, siliceous stone, silicon nitride, molybdenum carbide, boron carbide, tungsten carbide, titanium carbide, diatomaceous earth, dolomite, resins, and the like. In particular, carbon black, titanium oxide, barium sulfate, calcium carbonate, alumina, and nonmagnetic iron oxide ($\alpha\text{-Fe}_2O_3$) are preferably used.

In order to improve dispersibility, the nonmagnetic powder may be subjected to the above-described surface treatment.

In the case where the nonmagnetic powder is present in the nonmagnetic layer, the nonmagnetic powder has a particle size of 0.001 to 3 μm, preferably 0.005 to 1 μm, and particularly preferably 0.005 to 0.5 μm.

The amount of the nonmagnetic powder to be used in the nonmagnetic coating composition is selected so as to provide a nonmagnetic powder content of 5 to 99% by weight, preferably 30 to 95% by weight, particularly preferably 50 to 95% by weight, in the nonmagnetic layer.

The binder and solvent which can be used in the nonmagnetic coating composition can be selected appropriately from those materials in the above-described magnetic coating composition. Further, the additives usable in the magnetic coating composition may also be added, if desired, to the nonmagnetic coating composition.

The nonmagnetic coating composition can be prepared, for example, by initially mixing the nonmagnetic powder, the binder, and a portion of the solvent in a Naughter mixer, or the like, kneading the premixture in a continuous twin-screw kneader, or the like, diluting the mixture with another portion of the solvent, followed by dispersing by means of a sand mill, or the like, adding additives such as a lubricant to the dispersion, filtering the mixture, and adding thereto a hardener such as a polyisocyanate, and the remainder of the solvent.

In the case where the nonmrgnetic layer is provided, the nonmagnetic layer preferably has a thickness of 0.5 to 4 μm.

The intermediate magnetic layer is a layer formed by coating the substrate with an intermediate magnetic coating composition. The intermediate magnetic coating composition preferably comprises soft magnetic powder, a binder, and a solvent as main components.

While any soft magnetic powder can be used in the intermediate magnetic coating composition, magnetic materials used in miniatural devices such as a magnetic head and an electronic circuit, are preferred. For example, the soft magnetic materials described in Soshin Chikazumi, "Physics of Ferromagnetism, Vol II,—Magnetic Characteristics and Engineering Application—" pp. 368–376, Syokabo (1984) can be used. Soft magnetic oxide powders may be mentioned as specific examples.

Spinel type ferrite powders are preferably used as the soft magnetic oxide powder. Suitable spinel ferrite powders include magnetite, $MnFe_2O_4$, $CoFe_2O_4$, $NiFe_2O_4$, $MgFe_2O_4$, $Li_{0.5}Fe_{2.5}O_4$, Mn—Zn ferrite, Ni—Zn ferrite, Ni—Cu ferrite, Cu—Zn ferrite, Mg—Zn ferrite, and Li—Zn ferrite. Preferred are Mn—Zn ferrite and Ni—Zn ferrite. These soft magnetic oxide powders may be used either individually or as a combination of two or more.

Soft magnetic metal powder can also be used as the soft magnetic powder. Suitable soft magnetic metal powders include Fe—Si alloys, Fe—Al alloys, e.g., Al—perm, Alfenol and Alfer, Permalloy, e.g., Ni—Fe binary alloys or multinary alloys composed of the Ni—Fe binary system and Mo, Cu, Cr, or the like, Sendust (Fe—Si—Al alloy consisting of 9.6 wt % of Si, 5.4 wt % of Al, and the balance of Fe), and Fe—Co alloys. These metal powders may be used either individually or in combinations of two or more.

The soft magnetic oxide powder usually has a coercive force of more than 0 and less than 150 Oe and a saturation magnetization of 30 to 90 emu/g. The soft magnetic metal powder usually has a coercive force of more than 0 and less than 100 Oe and a saturation magnetization of 10 to 500 emu/g. In the present invention, spinel ferrite powders having a coercive force of more than 0 and less than 150 Oe are particularly preferred. That is, the intermediate magnetic layer preferably contains a spinel ferrite powder having a coercive force of more than 0 and less than 150 Oe.

The soft magnetic powder has a particle size of 1 to 1,000 nm, preferably 1 to 500 nm.

The intermediate magnetic layer preferably has a coercive force of 5 to 180 Oe and a saturation flux density of 500to 2500 gauss.

It is also preferably that the intermediate magnetic coating composition comprises a tabular hexagonal ferrite powder in the first invention. The tabular hexagonal ferrite powder has tabular diameter of 0.01 to 0.07 μm and a coercive force of 1400 to 2200 Oe. The tabular hexagonal ferrite powder includes the same as (c) employed in the second invention. Further, explanation of an example of the first invention in which the tabular hexagonal ferrite powder is used will be given in the description of Example 11. The intermediate magnetic layer in this case has a saturation flux density of 500to 2500 gauss.

The binder and solvent components of the intermediate magnetic coating composition can be selected appropriately from those usable in the above-described magnetic coating composition. Further, the additives usable in the magnetic coating composition may also be added to the intermediate magnetic coating composition. The intermediate magnetic coating composition can contain the nonmagnetic powder employed in the nonmagnetic coating composition.

The amount of the binder in the intermediate magnetic coating composition usually ranges from 5 to 200 parts by weight, preferably from 5 to 100 parts by weight, per 100 parts by weight of the total amount of the soft magnetic powder and the nonmagnetic powder if added. The amount of the solvent in the intermediate magnetic coating composition ranges from 80 to 500 parts by weight, preferably 100 to 350 parts by weight, per 100 parts by weight of the total amount of the soft magnetic powder and the nonmagnetic powder if added.

The intermediate magnetic layer usually has a thickness of 0.2 to 5 μm, preferably 0.5 to 4 μm, and particularly preferably 0.5 to 2.5 μm. If the thickness is less than 0.2 μm, the resulting magnetic recording medium tends to have reduced bending stiffness (flexural rigidity). If it exceeds 5 μm, the overwrite characteristics are reduced. Accordingly, the above thickness range is recommended.

The magnetic recording medium of the present invention is suitable as a magnetic tape such as a 8 mm videotape or a DAT tape. It is also applicable in the form of other recording media such as floppy discs.

The method for producing the magnetic recording medium of the present invention is described infra.

When a magnetic layer is provided directly on a substrate, the above-mentioned magnetic coating composition is directly applied to the substrate. Where a nonmagnetic layer or an intermediate magnetic layer is provided on a substrate, the above-described nonmagnetic coating composition or intermediate magnetic coating composition and the above-described magnetic coating composition are applied on the substrate by simultaneous coating, for example, wet-on-wet coating. In other words, where a nonmagnetic layer or an intermediate magnetic layer is provided on a substrate, a magnetic layer is preferably formed while the nonmagnetic layer or the intermediate magnetic layer is wet.

The coating layer is then subjected to orientation in a magnetic field, dried, and wound up, if desired, followed by calendering. If desired, a backcoating layer is then formed on the structure. When necessary, for example, in the production of magnetic tape, the coated film can be subjected to aging at 40° to 70° C. for 6 to 72 hours, followed by slitting to a desired width.

The above-mentioned simultaneous coating technique is described in Japanese Patent Laid-Open No. 5-73883, column 42, line 31 to column 43, line 31. This is a technique in which a magnetic coating composition, which forms a magnetic layer, is applied before a nonmagnetic coating composition for forming a nonmagnetic layer or an intermediate magnetic coating composition for forming an intermediate magnetic layer dries. By this technique, a smooth interface between the magnetic layer and the nonmagnetic layer or the intermediate magnetic layer and also satisfactory surface properties for the magnetic layer are secured. As a result, a magnetic recording medium which causes few dropouts and which can cope with high-density recording, is provided. The coating layer, inclusive of the magnetic layer and the nonmagnetic layer or the intermediate magnetic layer, has excellent durability.

Therefore, in the present invention, it is preferable that the nonmagnetic layer and the intermediate magnetic layer be formed by applying the nonmagnetic coating composition or the intermediate magnetic coating composition, respectively, to the substrate. The magnetic layer can be formed by applying the magnetic coating composition on the nonmagnetic layer or the intermediate magnetic layer; and the magnetic layer and the nonmagnetic layer or the intermediate magnetic layer be formed by simultaneous coating.

The magnetic orientation treatment is performed before the magnetic coating composition and the nonmagnetic coating composition or the intermediate magnetic coating composition (hereinafter sometimes referred to inclusively as "coating compositions") dry. For example, in the case where a magnetic tape, which serves as the magnetic recording medium of the present invention, is preferred the treatment can be carried out by one of the following methods (1) or (2):

Method (1):

While the coating compositions are wet, a magnetic field is made to interact with the coating compositions-coated substrate parallel to the coated surface in order to conduct magnetic orientation parallel to the coated surface by, for example, passing the coated substrate through a solenoid type magnet or a group of permanent magnets arranged in such a manner that poles of the same polarity face each other.

Method (2):

Magnetic orientation is performed in a direction perpendicular or oblique to the coating compositions-coated side of the substrate by passing the substrate through a group of permanent magnets arranged in such a manner that poles of opposite polarity face each other or by passing the substrate through a solenoid type magnet arranged so that a magnetic field acts perpendicularly or obliquely.

The intensity of the magnetic field which is applied is preferably 500 to 10000 Oe. If desired, in order to fix the orientation direction of the individual magnetic particles, a magnet may be placed in a drier, or heated air may be introduced while applying a magnetic field.

It is particularly preferred to conduct orientation in a direction perpendicular or oblique to the thickness direction of the magnetic recording medium simultaneously with the application of the magnetic coating compositions.

Methods for carrying out orientation in the perpendicular or oblique direction include the above-described method (2). More specifically, the orientation methods described in Japanese Patent Laid-Open Nos. 57-58241, 57-58242, 57-58243, 57-58244, 57-58246, 57-58247, 2-146106, 4-182932, 4-360020, and 5-334652 can be used appropriately.

Drying can be carried out, for example, by the use of gas heated at 30° to 120° C. The degree of drying can be controlled by adjusting the temperature and feed rate of the gas.

The calendering of the coating layer is carried out, for example, by supercalendering comprising passing the coated film between two rolls such as a combination of a metal roll and a cotton roll or a synthetic resin roll, or a combination of two metal rolls. The calendering is carried out at a roll surface temperature of 60° to 140° C. and a linear pressure of 100 to 500 kg/cm.

The backcoating layer, which can be provided if desired, is a layer formed on the back side of the substrate (the side opposite to the magnetic layer). It is formed by coating the substrate with a backcoating composition which is generally used for the formation of backcoating layers.

When the magnetic recording medium of the present invention is prepared, if desired, the resulting magnetic recording medium may be subjected to finishing such as polishing or cleaning of the magnetic layer. The magnetic coating composition, the nonmagnetic coating composition or the intermediate magnetic coating composition can also be applied by the known successive coating technique.

The second aspect of the invention is described as follows:

The details of the second aspect of the invention will be described only as to the points of difference between it and the first aspect of the invention, not on their points of commonality. Therefore, the explanation made for the first invention applies to the second invention as to the particulars except the hexagonal ferrite powder (c) hereinafter described, i.e., the structure of the magnetic recording medium, the substrate, the backcoating layer, the nonmagnetic layer, the magnetic intermediate layer, and the process for preparing the magnetic recording medium, and the like.

In the magnetic recording medium of the second aspect of the invention, the magnetic layer contains (c) a tabular hexagonal ferrite powder having a tabular diameter of 0.01 to 0.07 µm, preferably 0.01 to 0.06 µm, and a coercive force of 1400 to 2200 Oe, preferably 1500 to 2200 Oe, (b) a spinel ferrite powder (the same as the spinel ferrite powder (b) used in the first invention), and a binder (the same as the binder used in the first invention), the mixing ratio of the spinel ferrite powder (b) to the hexagonal ferrite powder (c) ((b)/(c)) being 0.03 to 0.3, preferably 0.05 to 0.25, by weight.

If the tabular diameter of the hexagonal ferrite powder (c) is less than 0.01 μm, the powder has reduced dispersibility. If it exceeds 0.07 μm, the magnetic layer has reduced surface smoothness. If the coercive force is less than 1400 Oe, the output in the radio-frequency region is reduced. If it is more than 2200 Oe, the overwrite characteristics and erasability characteristics are reduced.

If the (b)/(c) weight ratio is less than 0.03, the effect of adding the spinel ferrite powder (b) is insubstantial. If it exceeds 0.3, the magnetic layer will have a distribution of magnetic characteristics, causing problems in recording and reproduction.

The hexagonal ferrite powder (c) includes fine, hexagonal, and tabular particles of barium ferrite and strontium ferrite, and magnetic powders obtained by displacing part of the Fe atoms of these ferrites with Ti, Co, Zn, Ni, V or the like atom.

The hexagonal ferrite powder (c) preferably has an aspect ratio of 2 to 10, and a saturation magnetization of 40 to 70 emu/g.

Having generally described this invention, a further understanding can be obtained by reference to certain specific examples which are provided herein for purposes of illustration only and are not intended to be limiting unless otherwise specified.

Unless otherwise indicated, all the parts, percents, and ratios are given by weight.

EXAMPLE 1

A magnetic tape having a magnetic layer and a backcoating layer was prepared as a magnetic recording medium using a magnetic coating composition A and a backcoating composition having the following respective formulations in accordance with the method described below.

| Magnetic Coating Composition A: | |
|---|---|
| Acicular ferromagnetic metal powder comprised mainly of iron (Fe:Co:Ni:Al:Si:Y:Ba = 70:23:1:2:1:2:1; coercive force: 2120 Oe; saturation magnetization: 142 emu/g; average major axis length: 0.08 μm; specific surface area: 61 m²/g; X-ray measured particle size: 170 Å) | 95 parts |
| Mn-Zn ferrite (spherical) (saturation magnetization: 64 emu/g; coercive force: 80 Oe; average particle size: 0.028 μm; specific surface area: 52 m²/g) | 5 parts |
| α-Alumina (average particle size: 0.18 μm) | 5 parts |
| Carbon black (average primary particle size: 53 nm) | 0.5 parts |
| Vinyl chloride copolymer resin (sulfonic acid metal salt group content: 4 × 10⁻⁵ equiv./g; epoxy group content: 8 × 10⁻⁵ equiv./g; average degree of polymerization: 250) | 10 parts |
| Polyurethane resin (sulfonic acid metal salt group content: 7.5 × 10⁻⁵ equiv./g; number average molecular weight: 20000; weight average molecular weight: 40000) | 7 parts |
| Myristic acid | 1 part |
| Oleic acid | 1 part |
| 2-Ethylhexyl palmitate | 1 part |
| Butoxyethyl palmitate | 1 part |
| Polyisocyanate (Coronate-HX, a trade name of the product produced by Nippon Polyurethane Industry Co., Ltd.) | 4 parts |
| Methyl ethyl ketone | 132 parts |
| Toluene | 88 parts |
| Cyclohexanone | 44 parts |
| Backcoating Composition: | |
| Carbon black (average primary particle size: 0.028 μm) | 32 parts |
| Carbon black (average primary particle size: 0.062 μm) | 8 parts |
| Nipporan 2301 (a trade name of polyurethane, produced by Nippon Polyurethane Industry Co., Ltd.) | 20 parts |
| Celnova BTH ½ (a trade name of nitrocellulose, produced by Asahi Chemical Industry Co., LTD., Solid Content: 70%) | 28.6 parts |
| Polyisocyanate (D-250N, a trade name of the product produced by Takeda Chemical Industries, Ltd.) | 4 parts |
| Copper phthalocyanine | 1 part |
| Stearic acid | 1 part |
| Methyl ethyl ketone | 120 parts |
| Toluene | 120 parts |
| Cyclohexanone | 120 parts |

Preparation of Magnetic Recording Medium

The magnetic coating composition A was applied to a 7 μm thick polyethylene terelphthalate film to a dry thickness of 2.5 μm to form a coating layer of the magnetic coating composition. Simultaneously with the application, the coated substrate was passed first through a solenoid type magnet of 5000 Oe and then through (between) solenoid type magnets of 3000 Oe whose opposite poles faced each other in order to orient the coated substrate obliquely. The coated film was dried at 80° C. and wound up. The coated film was calendered at a roll surface temperature of 85° C. and a pressure of 350 kg/cm to form a magnetic layer. The opposite side of the substrate was then coated with the backcoating composition to a dry thickness of 0.5 μm, dried at 90° C., and wound up. After aging at 50° C. for 16 hours, the coated film was slit into an 8 mm wide strip to obtain a magnetic recording tape. A length of the resulting tape corresponding to 120-minute' recording was placed in a cassette case to prepare a 120-min. 8 mm video cassette.

The resulting magnetic tape as a magnetic recording medium was tested to evaluate its C/N characteristics and surface roughness in accordance with the following methods. The results obtained are shown in Table 1 below.

Methods of Measurement

1) C/N Characteristics (evaluation of 8 mm tape)

A signal wave of 9 MHz was recorded on a sample magnetic tape using an 8 mm video deck (a reformed commercially available Hi8 videotape recorder). The reproduction output (C) was observed with a spectrum analyzer, and a C/N ratio was obtained taking the level of 8 MHz as a noise level (N).

2) Center-line surface roughness of magnetic recording medium

Center-line surface roughness Ra was measured with a surface texture and contour measuring instrument "Surfcom 553A" manufactured by Tokyo Seimitsu Co., Ltd. under conditions of a stylus radius of 2 μm, load of 30 mg, a magnification of 200,000, and a cut-off of 0.08 mm.

The center-line average roughness Ra is a value (nm) obtained by the following formula, in which L is a length that the stylus moves, and the roughness curve is represented by y=f(x), taking the center line of the roughness curve as the X-axis and the height of vertical direction of X-axis as the Y-axis:

$$Ra = \frac{1}{L} \int_0^L |f(x)| dx$$

EXAMPLE 2

A magnetic tape was obtained in the same manner as described in Example 1, except for replacing the magnetic coating composition A with a magnetic coating composition B shown below. The resulting magnetic tape was evaluated in the same manner as described in Example 1. The results obtained are shown in Table 1.

Magnetic Coating Composition B

The same formulation as the magnetic coating composition A, except that the amounts of the acicular ferromagnetic metal powder mainly comprising iron and the Mn—Zn ferrite were changed to 90 parts and 10 parts, respectively.

EXAMPLE 3

A magnetic tape was obtained in the same manner as described in Example 1, except that the magnetic coating composition A was replaced with a magnetic coating composition C shown below. The resulting magnetic tape was evaluated in the same manner as described in Example 1. The results obtained are shown in Table 1.

Magnetic Coating Composition C

The same formulation as the magnetic coating composition A, except that the amounts of the acicular ferromagnetic metal powder mainly comprising iron and the Mn—Zn ferrite were changed to 80 parts and 20 parts, respectively.

EXAMPLE 4

A magnetic tape was obtained in the same manner as described in Example 1, except that the magnetic coating composition A was replaced with a magnetic coating composition E as shown below. The resulting magnetic tape was evaluated in the same manner as described in Example 1. The results obtained are shown in Table 1.

Magnetic Coating Composition E

The same formulation as the magnetic coating composition B, except that the Mn—Zn ferrite used in the composition B was replaced with the following Mn—Zn ferrite.

Mn—Zn Ferrite (spherical; saturation magnetization: 62 emu/g; coercive force: 21 Oe; average particle size: 0.08 µm; specific surface area: 25 m²/g)

EXAMPLE 5

A magnetic tape was obtained in the same manner as described in Example 1, except that the magnetic coating composition A was replaced with a magnetic coating composition F as shown below. The resulting magnetic tape was evaluated in the same manner as described in Example 1. The results obtained are shown in Table 1.

Magnetic Coating Composition F

The same formulation as the magnetic coating composition B, except that the Mn—Zn ferrite was replaced with the following amorphous magnetite.

Amorphous magnetite (saturation magnetization: 65 emu/g; coercive force: 76 Oe; average particle size: 0.022 µm; specific surface area: 56 m²/g)

COMPARATIVE EXAMPLE 1

A magnetic tape was obtained in the same manner as described in Example 1, except that the magnetic coating composition A was replaced with a magnetic coating composition D as shown below. The resulting magnetic tape was evaluated in the same manner as described in Example 1. The results obtained are shown in Table 1.

Magnetic Coating Composition D

The same formulation as the magnetic coating composition A, except that the amount of the acicular ferromagnetic metal powder mainly comprising iron was changed to 100 parts and that no Mn—Zn ferrite powder was used.

COMPARATIVE EXAMPLE 2

A magnetic tape was obtained in the same manner as described in Example 1, except for replacing the magnetic coating composition A with a magnetic coating composition G as shown below. The resulting magnetic tape was evaluated in the same manner as described in Example 1. The results obtained are shown in Table 1.

Magnetic Coating Composition G

The same formulation as the? magnetic coating composition B, except that the Mn—Zn ferrite was replaced with the following amorphous magnetite.

Amorphous magnetite (saturation magnetization: 82 emu/g; coercive force: 88 Oe; average particle size: 0.10 µm; specific surface area: 13 m²/g)

TABLE 1

|  |  | Magnetic Coating Composition | Center-line Surface Roughness Ra (nm) | C/N at 9MHz (db) |
|---|---|---|---|---|
| Examples | 1 | A | 4.8 | +1.2 |
|  | 2 | B | 4.2 | +1.6 |
|  | 3 | C | 4.6 | +1.4 |
|  | 4 | E | 5.1 | +0.9 |
|  | 5 | F | 4.4 | +1.4 |
| Comarative | 1 | D | 5.6 | −0.2 |
| Examples | 2 | G | 6.0 | 0 |

Note:
C/N expressed relatively taking Comparative Examples 2 as a standard

EXAMPLE 6

A magnetic tape was obtained in the same manner as described in Example 1, except that the magnetic coating composition A with a magnetic coating composition H shown below. The resulting magnetic tape was evaluated in the same manner as described in Example 1. The result obtained are shown in Table 2.

| Magnetic Coating Composition H: | |
|---|---|
| Hexagonal ferrite powder (hexagonal and tabular particles of Co-Ti-Ni-substituted barium ferrite powder; coercive force: 1860 Oe; saturation magnetization: 58 emu/g; average tabular diameter: 0.035 µm; aspect ratio: 3) | 90 parts |
| Ni-Zn ferrite (spherical) (saturation magnetization: 62 emu/g; coercive force: 18 Oe; average particle size: 0.032 µm; specific surface area: 49 m²/g) | 10 parts |
| α-Alumina (average particle size: 0.22 µm) | 6 parts |

-continued

| Magnetic Coating Composition H: | |
|---|---|
| Carbon black (average primary particle size: 53 nm) | 0.4 parts |
| Vinyl chloride copolymer resin (sulfonic acid metal salt group content: 4 × 10$^{-5}$ equiv./g; epoxy group content: 8 × 10$^{-5}$ equiv./g; average degree of polymerization: 250) | 8 parts |
| Polyurethane resin (sulfonic acid metal salt group content: 7.5 × 10$^{-5}$ equiv/g; number average molecular weight: 20000; weight average molecular weight: 40000) | 6 parts |
| Myristic acid | 1 part |
| Oleic acid | 1 part |
| 2-Ethylhexyl palmitate | 1 part |
| Butoxyethyl palmitate | 1 part |
| Polyisocyanate (Coronate-HX, a trade name of the product produced by Nippon Polyurethane Industry Co., Ltd.) | 3 parts |
| Methyl ethyl ketone | 105 parts |
| Toluene | 70 parts |
| Cyclohexanone | 35 parts |

EXAMPLE 7

A magnetic tape was obtained in the same manner as described in Example 1, except that the magnetic coating composition A was replaced with a magnetic coating composition J as shown below. The resulting magnetic tape was evaluated in the same manner as described in Example 1. The results obtained are shown in Table 2.

Magnetic Coating Composition J

The same formulation as the magnetic coating composition H, except that the Ni—Zn ferrite was replaced with the following amorphous magnetite.

Amorphous magnetite (saturation magnetization: 78 emu/g; coercive force: 110 Oe; average particle size: 0.043 µm; specific surface area: 22 m$^2$/g)

COMPARATIVE EXAMPLE 3

A magnetic tape was obtained in the same manner as described in Example 1, except that the magnetic coating composition A was replaced with a magnetic coating composition I as shown below. The resulting magnetic tape was evaluated in the same manner as described in Example 1. The results obtained are shown in Table 2.

Magnetic Coating Composition I

The same formulation as the magnetic coating composition H, except that the Ni—Zn ferrite used in the composition H was replaced with 15 parts of the following Ni—Zn ferrite:

Ni—Zn ferrite (spherical; saturation magnetization: 61 emu/g; coercive force: 17 Oe; average particle size: 0.11 µm; specific surface area: 11 m$^2$/g)

COMPARATIVE EXAMPLE 4

A magnetic tape was obtained in the same manner as described in Example 1, except that the magnetic coating composition A was replaced with a magnetic coating composition K as shown below. The resulting magnetic tape was evaluated in the same manner as described in Example 1. The results obtained are shown in Table 2.

Magnetic Coating Composition K

The same formulation as the magnetic coating composition H, except that the Ni—Zn ferrite was replaced with 10 parts of the following spherical magnetite:

Spherical magnetite (saturation magnetization: 83 emu/g; coercive force: 95 Oe; average particle size: 0.12 µm; specific surface area: 10 m$^2$/g)

COMPARATIVE EXAMPLE 5

A magnetic tape was obtained in the same manner as in Example 1, except that the magnetic coating composition A was replaced with a magnetic coating composition L as shown below. The resulting magnetic tape was evaluated in the same manner as described in Example 1. The results obtained are shown in Table 2.

Magnetic Coating Composition L

The same formulation as the magnetic coating composition H, except that the amount of the hexagonal ferrite powder was changed to 100 parts and that no Ni—Zn ferrite was used.

TABLE 2

| | | Magnetic Coating Composition | Center-line Surface Roughness Ra (nm) | C/N at 9MHz (db) |
|---|---|---|---|---|
| Examples | 6 | H | 4.9 | +1.2 |
| | 7 | J | 5.2 | +0.9 |
| Comarative Examples | 3 | I | 6.2 | −0.1 |
| | 4 | K | 6.3 | 0 |
| | 5 | L | 6.7 | −0.5 |

Note:
C/N expressed relatively taking Comparative Examples 4 as a standard.

EXAMPLE 8

A magnetic tape having a magnetic layer, a nonmagnetic layer, and a backcoating layer was prepared as ea magnetic recording medium using the magnetic coating composition A, a nonmagnetic coating composing M having the following formulation, and the same backcoating composition as used in Example 1in accordance with the method described below.

| Nonmagnetic Coating Composition M: | |
|---|---|
| Acicular α-Fe$_2$O$_3$ powder (average major axis length: 0.12 µm; acicular ratio: 8; specific surface area: 58 m$^2$/g) | 100 parts |
| α-Alumina (average particle size: 0.1 8 µm) | 3 parts |
| Carbon black (average primary particle size: 20 nm) | 2 parts |
| Vinyl chloride copolymer resin (sulfonic acid metal salt group content: 4 × 10$^{-5}$ equiv./g; epoxy group content: 8 × 10$^{-5}$ equiv./g; average degree of polymerization; 250) | 12 parts |
| Polyurethane resin (sulfonic acid metal salt group content: 7.5 × equiv./g; number average molecular weight: 20000; weight average molecular weight: 40000) | 8 parts |
| 2-Ethylhexyl palmitate | 1 part |
| Butoxyethyl palmitate | 1 part |
| Polyisocyanate (Coronate-HX, a trade name of the product produced by Nippon Polyurethane Industry Co., Ltd.) | 4 parts |
| Methyl ethyl ketone | 108 parts |

| Nonmagnetic Coating Composition M: | |
|---|---|
| Toluene | 72 parts |
| Cyclohexanone | 36 parts |

Preparation of Magnetic Recording Medium

The magnetic coating composition A and the nonmagnetic coating composition M were simultaneously applied to a 7 μm thick polyethylene terephthalate film to a dry thickness of 0.3 μm and 2.2 μm, respectively, to form a coating layer composed of the magnetic coating composition and the nonmagnetic coating composition. Simultaneously with the application, the coated substrate was passed first through a solenoid type magnet of 5000 Oe and then through (between) solenoid type magnets of 3000 Oe whose opposite poles faced each other to magnetically orient the coated substrate according to the above-described method obliquely. The coated film was dried at 80° C. and wound up. The coated film was then calendered at a roll surface temperature of 85° C. and a pressure of 350 kg/cm to form a magnetic layer and a nonmagnetic layer. The opposite side of the substrate was then coated with the backcoating composition to a dry thickness of 0.5 μm, dried at 90° C., and wound up. After aging at 50° C. for 16 hours, the coated film was slit into an 8 mm wide strip to prepare a magnetic recording tape. A length of the resulting tape corresponding to 120-minute' recording was placed in a cassette case to prepare a 120-min. 8 mm video cassette.

The resulting magnetic tape was evaluated for the C/N characteristics and surface roughness in the same manner as described in Example 1. The results obtained are shown in Table 3 below.

EXAMPLE 9

A magnetic tape was obtained in the same manner as described in Example 8, except that the magnetic coating composition A was replaced with the magnetic coating composition C. The resulting magnetic tape was evaluated in the same manner as described in Example 1. The results obtained are shown in Table 3 below.

EXAMPLE 10

A magnetic tape was obtained in the same manner as described in Example 8, except that the magnetic coating composition A was replaced with the magnetic coating composition H. The resulting magnetic tape was evaluated in the same manner as described in Example 1. The results obtained are shown in Table 3 below.

EXAMPLE 11

A magnetic tape was prepared in the same manner as described in Example 8, except that the magnetic coating composition A was replaced with the magnetic coating composition F and that the nonmagnetic coating composition M was replaced with a magnetic intermediate coating composition N as shown below. The resulting magnetic tape was evaluated in the same manner as described in Example 1. The results obtained are shown in Table 3.

Magnetic Intermediate Coating Composition N

The same formulation as the nonmagnetic coating composition M except that the amount of the acicular α-$Fe_2O_3$ powder was changed to 50 parts and that 50 parts of the following hexagonal ferrite powder were added:

Hexagonal ferrite powder (hexagonal particles of Co—Ti—Ni-substituted barium ferrite; coercive force: 1850 Oe; saturation magnetization: 54 emu/g; average tabular diameter: 0.04 μm; aspect ratio: 3)

EXAMPLE 12

A magnetic tape was obtained in the same manner as described in Example 8, except that the magnetic coating composition A was replaced with the magnetic coating composition J and that the nonmagnetic coating composition M was replaced with the following magnetic intermediate coating composition P. The resulting magnetic tape was evaluated in the same manner as described in Example 1. The results Obtained are shown in Table 3.

Magnetic Intermediate Coating Composition P

The same formulation as the nonmagnetic coating composition M except that the acicular α-$Fe_2O_3$ powder was replaced with 100 parts of the following amorphous magnetite powder:

Amorphous magnetite powder (saturation magnetization: 65 emu/g; coercive force: 76 Oe; average particle size: 0.022 μm; specific surface area: 56 $m^2/g$)

COMPARATIVE EXAMPLE 6

A magnetic tape was prepared in the same manner as described in Example 8, except that the magnetic coating composition A was replaced with the magnetic coating composition D. The resulting magnetic tape was evaluated in the same manner as described in Example 1. The results obtained are shown in Table 3.

COMPARATIVE EXAMPLE 7

A magnetic tape was obtained in the same manner as described in Example 8, except that the magnetic coating composition A was replaced with the magnetic coating composition G. The resulting magnetic tape was evaluated in the same manner as described in Example 1. The results obtained are shown in Table 3.

COMPARATIVE EXAMPLE 8

A magnetic tape was obtained in the same manner as described in Example 8, except that the magnetic coating composition A was replaced with the magnetic coating composition L. The resulting magnetic tape was evaluated in the same manner as described in Example 1. The results obtained are shown in Table 3.

COMPARATIVE EXAMPLE 9

A magnetic tape was prepared in the same manner as described in Example 8, except that the magnetic coating composition A was replaced with the magnetic coating composition I. The resulting magnetic tape was evaluated in the same manner as described in Example 1. The results obtained are shown in Table 3.

COMPARATIVE EXAMPLE 10

A magnetic tape was obtained in the same manner as described in Example 8, except that the magnetic coating composition A was replaced with the magnetic coating composition D and that the nonmagnetic coating composition M was replaced with the magnetic intermediate coating composition N. The resulting magnetic tape was evaluated in the same manner as described in Example 1. The results obtained are shown in Table 3.

COMPARATIVE EXAMPLE 11

A magnetic tape was prepared in the same manner as described in Example 8, except that the magnetic coating composition A was replaced with the magnetic coating composition G and that the nonmagnetic coating composition M was replaced with the magnetic intermediate coating composition P. The resulting magnetic tape was evaluated in the same manner as described in Example 1. The results obtained are shown in Table 3.

COMPARATIVE EXAMPLE 12

A magnetic tape was prepared in the same manner as described in Example 8, except that the magnetic coating composition A was replaced with the magnetic coating composition L and that the nonmagnetic coating composition M was replaced with the magnetic intermediate coating composition P. The resulting magnetic tape was evaluated in the same manner as described in Example 1. The results obtained are shown in Table 3.

COMPARATIVE EXAMPLE 13

A magnetic tape was prepared in the same manner as described in Example 8, except that the magnetic coating composition A was replaced as the magnetic coating composition K and that the nonmagnetic coating composition M was replaced with the following magnetic intermediate coating composition Q. The resulting magnetic tape was evaluated in the same manner as described in Example 1. The results obtained are shown in Table 3.

Magnetic Intermediate Coating Composition Q

The same formulation as the nonmagnetic coating composition M except that the acicular α-$Fe_2O_3$ powder was replaced with 100 parts of the following acicular magnetite powder.

Acicular magnetite powder (saturation magnetization: 84 emu/g; coercive force: 420 Oe; average particle size: 0.18 µm; acicular ratio: 10; specific surface area: 41 $m^2/g$)

an acicular ferromagnetic metal powder (a) having an average major axis length of 0.05 to 0.14 µm and a coercive force of 1700 to 2300 Oe, and a spherical or amorphous spinel ferrite powder (b) having an average particle size of 0.005 to 0.09 µm and a coercive force of more than 0 and less than 150 Oe, wherein the mixing ratio of said spinel ferrite powder (b) to said ferromagnetic metal powder (a) ((b)/(a)) is 0.03 to 0.3 by weight.

2. A magnetic recording medium comprising a substrate and a magnetic layer provided thereon, said magnetic layer containing:

a binder, a tabular hexagonal ferrite powder (c) having a tabular diameter of 0.01 to 0.07 µm and a coercive force of 1400 to 2200 Oe, and a spherical or amorphous spinel ferrite powder (b) having an average particle size of 0.005 to 0.09 µm and a coercive force of more than 0 and less than 150 Oe, wherein the mixing ratio of said spinel ferrite powder (b) to said hexagonal ferrite powder (c) ((b)/(c)) is 0.03 to 0.3 by weight.

3. The magnetic recording medium according to claim 1, wherein said spinel ferrite powder (b) is at least one member selected from the group consisting of magnetite, Mn—Zn ferrite, Ni—Zn ferrite, Zn ferrite, Mn ferrite, and Ni ferrite.

4. The magnetic recording medium according to claim 2, wherein said spinel ferrite powder (b) is at least one member selected from the group consisting of magnetite, Mn—Zn ferrite, Ni—Zn ferrite, Zn ferrite, Mn ferrite, and Ni ferrite.

5. The magnetic recording medium according to claim 1, wherein said medium further comprises a non-magnetic layer or an intermediate magnetic layer coated on said substrate and positioned between said magnetic layer and said substrate, and said magnetic layer having a thickness of 0.05 to 0.6 µm.

TABLE 3

|  |  | Magnetic Coating Composition | Nonmagnetic Coating Composition or Magnetic Intermediate Coating Composition |  | Center-line Surface Roughness Ra (nm) | C/N at 9 MHz (dB) |
|---|---|---|---|---|---|---|
| Examples | 8 | Coating composition A | Nonmagnetic coating composition | M | 4.6 | +1.4 |
|  | 9 | Coating composition C | Nonmagnetic coating composition | M | 4.4 | +1.6 |
|  | 10 | Coating composition H | Nonmagnetic coating composition | M | 3.7 | +1.8 |
|  | 11 | Coating composition F | Magnetic intermediate coating composition | N | 4.2 | +1.7 |
|  | 12 | Coating composition J | Magnetic intermediate coating composition | P | 4.5 | +1.3 |
| Comparative Examples | 6 | Coating composition D | Nonmagnetic coating composition | M | 5.3 | −0.3 |
|  | 7 | Coating composition G | Nonmagnetic coating composition | M | 5.6 | 0 |
|  | 8 | Coating composition L | Nonmagnetic coating composition | M | 6.1 | −0.4 |
|  | 9 | Coating composition I | Nonmagnetic coating composition | M | 6.4 | −0.5 |
|  | 10 | Coating composition D | Magnetic intermediate coating composition | N | 5.6 | −0.6 |
|  | 11 | Coating composition G | Magnetic intermediate coating composition | P | 6.4 | −0.4 |
|  | 12 | Coating composition L | Magnetic intermediate coating composition | P | 6.1 | −0.3 |
|  | 13 | Coating composition K | Magnetic intermediate coating composition | Q | 5.9 | −1.2 |

Note: C/N is expressed relatively taking Comparative Example 7 as a standard.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A magnetic recording medium comprising a substrate and a magnetic layer provided thereon, said magnetic layer containing:

a binder,

6. The magnetic recording medium according to claim 2, wherein said medium further comprises a non-magnetic layer or an intermediate magnetic layer coated on said substrate and positioned between said magnetic layer and said substrate, and said magnetic layer having a thickness of 0.05 to 0.6 µm.

7. The magnetic recording medium according to claim 5, wherein said intermediate magnetic layer contains a spinel ferrite powder having a coercive force of more than 0 and less than 150 Oe.

8. The magnetic recording medium according to claim 6, wherein said intermediate magnetic layer contains a spinel ferrite powder having a coercive force of more than 0 and less than 150 Oe.

9. The magnetic recording medium according to claim 5, wherein said intermediate magnetic layer contains a tabular hexagonal ferrite powder.

10. The magnetic recording medium according to claim 9, wherein said tabular hexagonal ferrite has a tabular diameter of 0.01 to 0.07 μm and a coercive force of 1400 to 2200 Oe.

11. The magnetic recording medium according to claim 1, wherein said binder contains at least one of a vinyl chloride copolymer or a polyurethane each containing, in a polymer molecule, $10^{-8}$ to $10^{-2}$ equivalent/g of at least one polar group selected from the group consisting of a phosphoric acid group, a salt thereof, a sulfonic acid group and a salt thereof.

12. The magnetic recording medium according to claim 2, wherein said binder contains at least one of a vinyl chloride copolymer or a polyurethane each containing, in a polymer molecule, $10^{-8}$ to $10^{-2}$ equivalent/g of at least one polar group selected from the group consisting of a phosphoric acid group, a salt thereof, a sulfonic acid group and a salt thereof.

13. The magnetic recording medium according to claim 1, wherein said mixing ratio (b)/(a) is 0.05 to 0.25.

14. The magnetic recording medium according to claim 2, wherein said ratio (b)/(c) is 0.05 to 0.25.

15. The magnetic recording medium according to claim 1, wherein said major axis length of the acicular ferromagnetic metal powder ranges from 0.05 to 0.12 μm.

16. The magnetic recording medium according to claim 2, wherein said tabular diameter of the tabular hexagonal ferrite powder ranges from 0.01 to 0.06 μm.

17. The magnetic recording medium according to claim 1, wherein the coercive force of said spinel ferrite powder (b) is more than 0 and less than 130 Oe.

18. The magnetic recording medium according to claim 2, wherein the coercive force of said spinel ferrite powder (b) is more than 0 and less than 130 Oe.

19. The magnetic recording medium according to claim 5, wherein said magnetic recording medium is prepared by simultaneously coating a substrate with a magnetic coating composition and a non-magnetic coating composition.

20. The magnetic recording medium according to claim 5, wherein said magnetic recording medium is prepared by simultaneously coating a substrate with a magnetic coating composition and an intermediate magnetic coating composition.

21. The magnetic recording medium according to claim 6, wherein said magnetic recording medium is prepared by simultaneously coating a substrate with a magnetic coating composition and a non-magnetic coating composition.

22. The magnetic recording medium according to claim 6, wherein said magnetic recording medium is prepared by simultaneously coating a substrate with a magnetic coating composition and an intermediate magnetic coating composition.

23. The magnetic recording medium according to claim 1, wherein said magnetic layer is formed by coating said substrate with a magnetic coating composition comprising (i) a binder, (ii) said acicular ferromagnetic metal powder (a) and (iii) said spherical or amorphous spinel ferrite powder (b) and simultaneously subjecting said coating to magnetic orientation in a direction perpendicular or oblique to the plane of the magnetic recording medium.

24. The magnetic recording medium according to claim 2, wherein said magnetic layer is formed by coating said substrate with a magnetic coating composition comprising (i) a binder, (ii) said tabular hexagonal ferrite powder (c) and (iii) said spherical or amorphous spinel ferrite powder (b) and simultaneously subjecting said coating to magnetic orientation in a direction perpendicular or oblique to the plane of the magnetic recording medium.

* * * * *